April 1, 1941. R. ROBERT 2,236,838
LATERAL CONTROL FOR AIRPLANES
Filed March 4, 1939 4 Sheets-Sheet 1
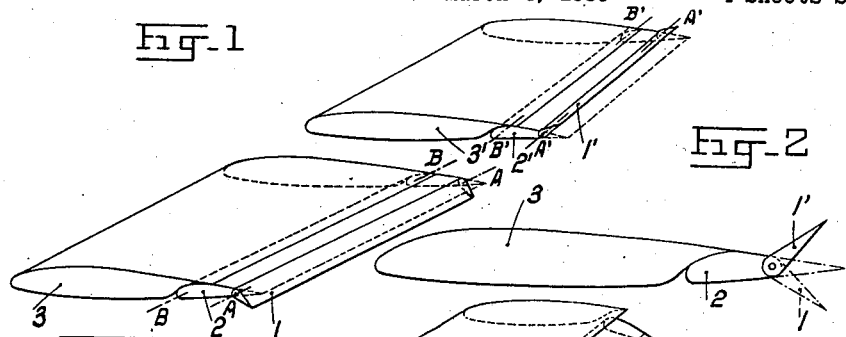
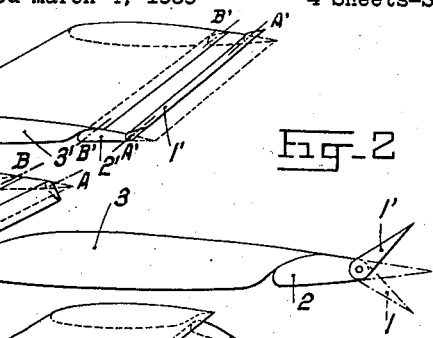
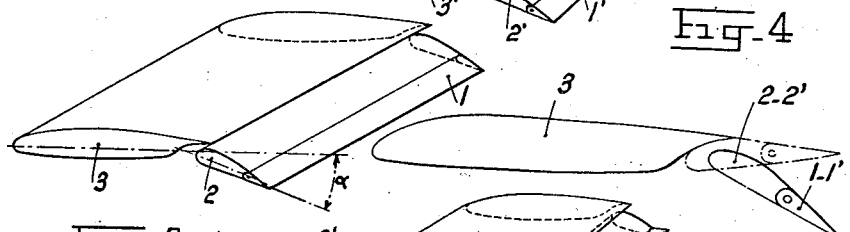
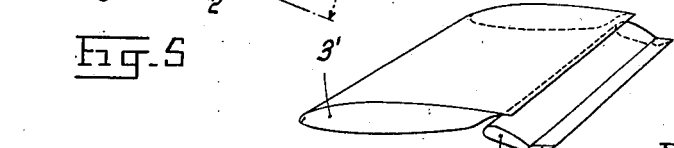
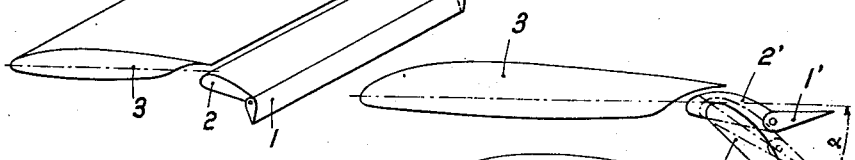
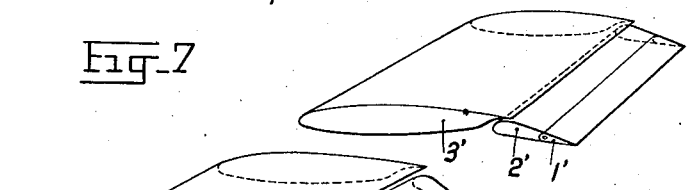
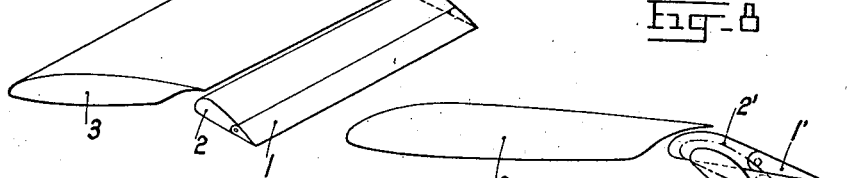
Inventor,
R. Robert
By: Glascock Downing & Seebold
Attys.

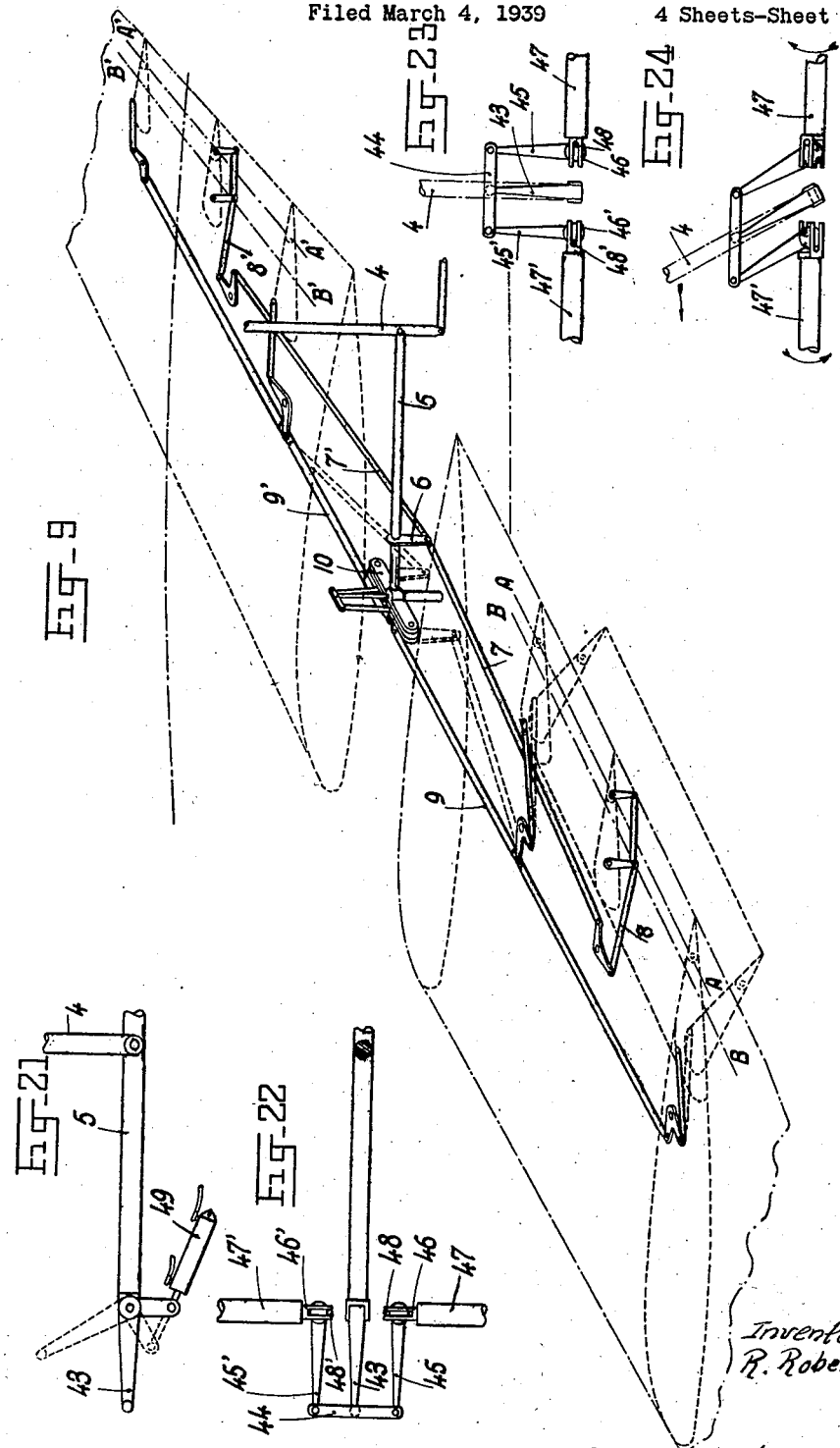

April 1, 1941. R. ROBERT 2,236,838
LATERAL CONTROL FOR AIRPLANES
Filed March 4, 1939 4 Sheets-Sheet 3
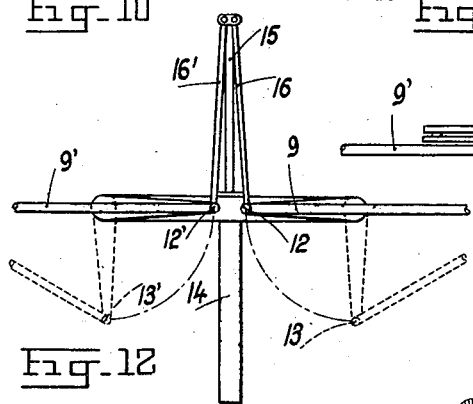
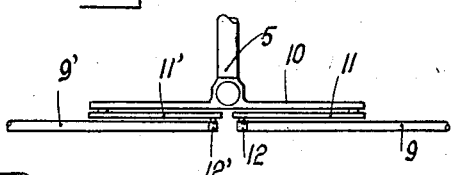
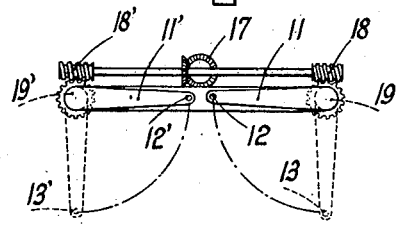
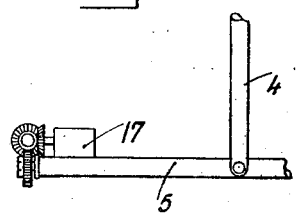
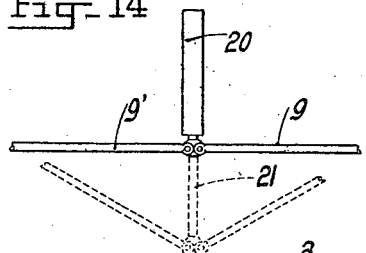
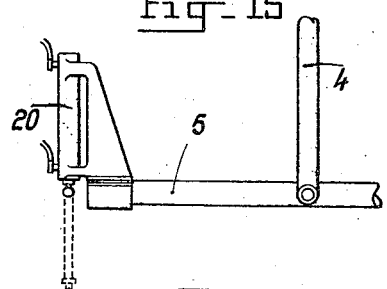
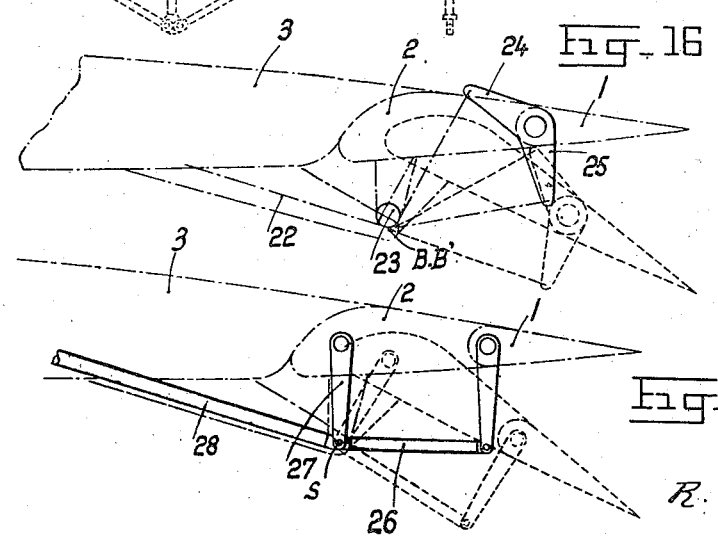
Inventor,
R. Robert
by: Glascock Downing & Seebold
Attys.

April 1, 1941.  R. ROBERT  2,236,838
LATERAL CONTROL FOR AIRPLANES
Filed March 4, 1939    4 Sheets-Sheet 4

Inventor;
R. Robert
By: Glascock Downing & Seebold
Attys.

Patented Apr. 1, 1941

2,236,838

UNITED STATES PATENT OFFICE 2,236,838

LATERAL CONTROL FOR AIRPLANES

Roger Robert, Boulogne-sur-Seine, France

Application March 4, 1939, Serial No. 259,893
In France March 4, 1938

4 Claims. (Cl. 244—42)

The present invention consists of a special arrangement of the wing-flaps with which the wings of an airplane are usually provided.

It has for its object, by a suitable fractional division of such wing-flaps, to enable them to fulfil, at the same time and in a more effective and appropriate manner than has been done heretofore, the two following functions:

(1) The transverse control of the airplane;
(2) The additional lifting.

The arrangement according to the invention permits, since each wing-flap is subdivided into at least two parts, of utilizing as movable surfaces either a single one of these parts or the whole number, in order to better adapt their efficacity, in each of the functions considered, to the speed of flight of the airplane:

(1) At high speeds, the minimum amount of the movable surfaces which is necessary to produce the rolling torque required for the transverse control of the airplane, will be put in action;

(2) At slow speeds, the whole of the movable surface will provide for the transverse control and for the additional lifting.

In conformity to the invention, and in order to obtain the above-mentioned results, each wing-flap is subdivided, in the direction of the width of the wing, into two or more parts, the part at the end being normally subjected to the usual operating action for the transverse control, whereas the other parts are not subjected to this operating action when in the inoperative position, but they may be brought, by the effect of a second and independent operative action, into a working position in which they are more or less lowered, thus providing for the additional lifting, and for which they are gradually subjected to the operating action for the transverse control, which enables them to participate in this control.

The advantages afforded by this arrangement are apparent, in view of the difficulties which are usually encountered when calculating the dimensions of the warping wing-flaps which are to assume, in addition to the transverse control, the function of additional lifting flap.

In a general manner, in view of the constantly increasing speed of airplanes, it is of interest to reduce to a minimum, for a given surface, the relative width (with reference to the width of wing in consideration) of the warping wing-flaps, in order to limit the stresses in their actuating system and also in the framework of the wing, and to eliminate the risks of flapping or jarring.

However, at slow speeds, such wing-flaps are insufficient, and if they are also to act as additional lifting flaps, the increase of lifting power which they give to the wings to which they are hinged, is then very small. The additional lifting flaps must, in fact, in order to appreciably increase the lifting power of the wings, have such dimensions that their relative width, with reference to the width of the wing under consideration, shall not be below a certain value. By way of indication, and to facilitate the comprehension, it will be stated that this minimum value is usually at least equal to 30% of the width of the wing, while the width of the warping wing-flaps of a high-speed airplane will not properly exceed 15 to 20%.

It will be thus observed that an improved warping wing-flap which is exactly adapted for its function is an additional lifting flap having but little efficiency, whereas an additional lifting flap which is properly designed will show, when employed for the transverse control at high speeds, dangerous drawbacks which are contrary to the safety and ease of handling.

At the same time that the parts of each wing flap other than the part at the end are subjected to the effect of the transverse control by the operative action for additional lifting, the said end part may be gradually withdrawn from the effect of this control, and thus it will no longer be subject to displacements which are distinct from those of the other parts, and it will only participate in the displacements of these latter; the total surface of the wing-flap is then substituted, as to the transverse control, for the surface of the end part of the wing-flap.

The following description, which is given by way of example, relates to an embodiment of the invention, with certain modifications of construction, with reference to the accompanying drawings.

Fig. 1 is a perspective view showing the pivoting of the end parts of the wing-flaps in contrary directions, for the transverse control at high speeds.

Fig. 2 is a corresponding lengthwise section.

Fig. 3 is a perspective view showing the lowering of the entire wing-flaps for the additional lifting, the end parts being in the neutral position.

Fig. 4 is a corresponding lengthwise section.

Fig. 5 is a perspective view showing the pivoting of the wing-flaps in contrary directions, starting from the neutral position for additional lifting as shown in Fig. 3.

Fig. 6 is a corresponding lengthwise section.

Fig. 7 is a perspective view showing the pivoting of the entire wing flaps, starting from the neutral position for additional lifting as shown in Fig. 3.

Fig. 8 is a corresponding lengthwise section.

Fig. 9 is a general perspective view of a constructional form for the controls of the different parts of an airplane.

Figs. 10 and 11 are two corresponding elevational and plan views showing the method of action for the control for additional lifting.

Figs. 12 and 13 show a modification.

Figs. 14 and 15 show another modification.

Figs. 16 to 19 show various constructions for the rod-and-link gear controlling the end parts.

Figs. 21 to 24 show another construction for the control of the parts used for additional lifting.

Figure 18:
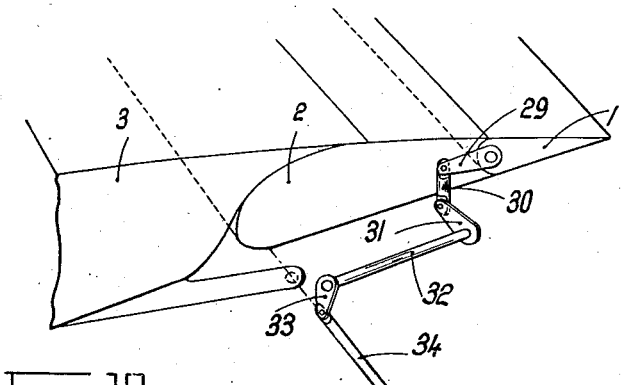

In the constructions shown in the drawings, it is supposed that each wing-flap consists of two parts, a part at the end 1—1, and a part 2—2' situated between the said end part and the fixed part 3—3' of the wing; the reference numerals without indication correspond to one side of the machine and the others to the other side.

The end parts 1—1' turn about an axis AA or AA' which is located in the interior or at the exterior of the outline of the wing, and is fixed with reference to the parts 2—2', and these latter may turn, while thus actuating the end parts, about an axis BB or B'B' which is fixed with reference to the fixed parts B—B'.

The pivoting movements which may be made, in the upward and downward directions, by the parts 1—1' under the effect of the usual action for the transverse control, will produce a rolling torque having a suitable value at high speeds, this being shown in Figs. 1 and 2 (descent of the part 1 and rise of the part 1').

Moreover, independently of the transverse control, it is possible to give to the parts 2—2', simultaneous pivoting movements in the downward direction, to a greater or less degree, in order to provide for the additional lifting. This is shown in Figs. 3 and 4, in which the parts 1—1' have been given no displacement relatively to the parts 2—2'. In order to simplify the following explanations, the positions such as those shown in Figs. 3 and 4 will be designated further in the description as "neutral positions of additional lifting"; for these positions, the pivoting angle α is variable and is for instance between 0° and the maximum a°.

Starting from any one of such neutral positions of additional lifting, the end parts 1—1' may pivot in contrary directions by the effect of the operation for transverse control, and to the resulting rolling torque may be added the effect of contrary pivoting movements, either equal or unequal, and upward or downward, of the parts 2—2', and these, owing their preliminary downward pivoting, will come under the action of the transverse control. This is shown in Figs. 5 and 6, in which the corresponding neutral position is shown in the dot-and-dash lines. The degree of these inverse pivotings of the transverse control under the effect of the usual operating action may vary gradually from 0, for α=0° (Figs. 1 and 2) to a maximum when α=a°, this maximum depending upon the value of the rolling torque desired, at the slowest speeds.

For the positions of transverse control which are taken when starting from neutral positions of additional lifting, it has been already stated that the parts 1—1' preserve their freedom of operation about AA'. However, it is also feasible, according to the invention, for the neutral positions of additional lifting to gradually withdraw the parts 1—1 from the effect of the transverse control, and thus, starting from extreme neutral positions of additional lifting, the entire wing-flaps are pivoted in contrary directions, while the end parts will not be independently displaced. This is shown in Figs. 7 and 8, in which the corresponding neutral position is shown by dot-and-dash lines.

The operating arrangements for the different parts of the wing-flaps may be carried out in a great variety of ways without departing from the principle of the invention.

In the construction shown in Fig. 9, the operating arrangement for the end wing-flaps 1—1' is of a known type, and comprises a bar 4 which acts through a shaft 5 and a lever 6 mounted on the same, upon the rod-and-link gear 7—7' which actuates, through a suitable transmission, the links 8—8' actuating the end parts 1—1'. The shaft 5 is connected with the rod-and-link gear 9—9' actuating the parts 2—2', by a device such that the general operating parts 4—5 will have no action upon the said rod-and-link gear 9—9' when this latter is in the position in which the parts 2—2' are not used.

Such a device is shown in Figs. 10 and 11. The shaft 5 carries a transverse arm 10 whose ends are pivoted to levers 11—11' which are pivoted to the rod-and-link gear 9—9' upon axles 12—12'. In the position in which the parts 2—2' are not used, the points 12—12' are quite near the axis of the shaft 5, and thus they will not be appreciably displaced during the rotation of this shaft. The parts 2—2' are now out of the action of the transverse control.

By the effect of an independent operative action, the pilot can turn the levers 11—11' relatively to the arm 10 in order to bring the pivoting points 12—12 to the positions 15—15'. This rotation of the arms 11—11' lowers the parts 2—2' to a position of additional lifting. In the devices shown in Figs. 10 and 11, it is supposed that the rotation of the arms 11—11' is effected by a jack 14 which is mounted on the shaft 5 and whose movable part 15 is pivoted to links 16—16' which are pivoted to axles 12—12'.

When the axles 12—12' are moved into the positions 13—13', they now separate from the axis of the shaft 5 and now depend upon the operating device 4—5, and thus the parts 2—2' are pivoted in contrary directions when the pilot acts upon the operating bar 4. This dependency of the rod-and-link gear 9—9 upon the operating device 4—5 is progressive according as the axles 12—12' separate from the shaft 5.

Figs. 12 and 13 show a modified form of the controlling action for additional lifting. Instead of being performed by pneumatic or hydraulic means, the operation takes place by an electric motor 17, and this, through gearing 18—18', rotates the pivot axles 19—19' of the levers 11—11' with reference to the arm 10.

Figs. 14 and 15 show another modification in which use is made, for the control of the additional lifting, of a jack 20 which is mounted on the shaft 5 as in Figs. 10 and 11, but whose movable part 21 is pivoted directly to the rod-and-link gear 9—9'.

Figs. 16 to 19 show forms of realization of the actuating rod-and-link gear by parts situated at the end, in order that the said gear may operate normally, whatever be the position of the adjacent parts 2—2'.

In the construction shown in Fig. 16, the wing-flaps 1—1' are operated by cables 22 which pass over supporting pulleys 23 which are tangent to the axis of rotation BB', and thus the rotation of the parts 2—2' does not change the relative position of the parts 1—1'; the cables 22 can control the parts 1—1', through levers 24—25.

In the case of Fig. 10, the parts 1—1' are each actuated by one or more links 26, connected with one or more levers 27 which are pivoted at S to the actuating rod-and-link gear 28, the points S being located on the axis BB'.

In the construction shown in Fig. 18, the wing-flaps 1—1' are each actuated by one or more levers 29 which are operated by a link 30 which is pivoted to a lever 31 secured to a torsion shaft 32. This shaft carries another lever 33 actuated by the driving rod-and-link gear 34, and the said gear acts upon the lever 33 at a point which coincides, for the neutral position of the part 1—1', with the axis of rotation BB' of the part 2.

Figure 19:
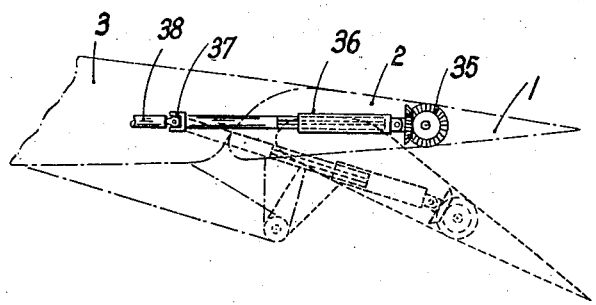

In the construction shown in Fig. 19, the part 1—1' is actuated by means of a gear-wheel 35 and a telescoping tube 36 with flutings, connected by a Cardan joint 37 to the driving shaft 38; when the part 2 is rotated, the telescoping tube becomes lengthened, and by its rotation it continues to actuate the end parts 1.

Figure 20:
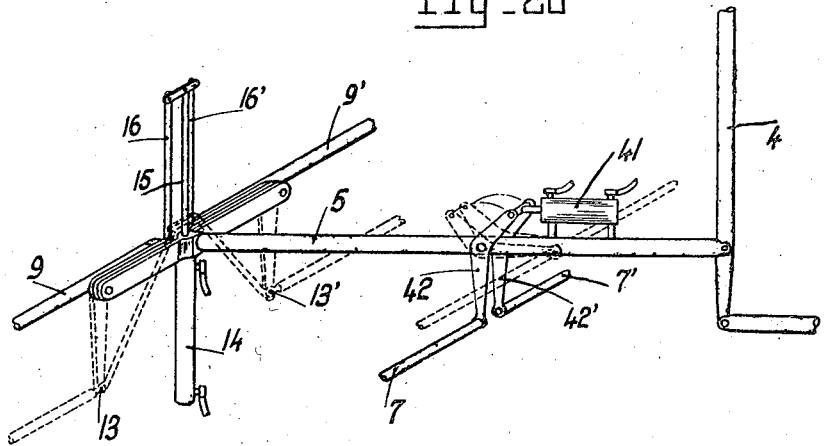
Fig. 20 is a general perspective view of a system of control which permits, for the position of additional lifting, of withdrawing the end elements from the distinct displacements resulting from a transverse control.

Fig. 20 shows an actuating arrangement in which, when the parts 2—2' are lowered, and these parts are made to depend upon the transverse control, the part 1—1 will be placed out of the action of this control.

For this purpose, a second hydraulic jack 41, actuated by the same source of power as the jack 41, will cause, at the same time as the rotation of the levers 11'—11' of the control of additional lifting, the rotation of the levers 42—42' mounted between the shaft 5 and the rod-and-link gear 7—7' actuating the end parts, in such way as to bring the starting points of the parts 7—7' quite near the shaft 5. In this case, the rotation of the shaft 5 has no appreciable action upon the rod-and-link gear 7—7'. It is also feasible to employ, instead of a second jack 41, a mechanical connection between the levers 11—11' and the levers 42—42'. As soon as the rod-and-link gear is placed out of the action of the transverse control, the wing-flaps will be displaced as a whole, as indicated with reference to Figs. 7 and 8.

The rotation of the levers 42—42' may be extended beyond the shaft 5 when the parts 2—2 are turned down, so that the operating of the transverse control will act in the contrary direction upon the end parts of the wing-flaps, thus providing an aerodynamic compension in the known manner.

Figs. 21 to 24 shows another arrangement for operating the additional lifting parts.

In this arrangement, a bell-crank lever 43 is pivoted at the end of the shaft 5, and one arm of said lever is in the idle position in an extended part of the shaft 5, and is engaged by a ball piece at the middle part of a link 44 which is pivoted to the levers 45 and 45', the said levers each carry a ball which operates in a fork 46—46' mounted on the ends of the shafts 47—47' actuating the additional lifting parts. The ball pieces of the levers 45—45' carry axles 48—48', and in the idle position (Figs. 21-22) these have the oblique position, in a plane perpendicular to the axle of the shaft 5, said axles being engaged in slides on the forks 46—46'. The control of the additional lifting is effected by a jack 49 which acts upon a bell-crank lever 42 in order to separate this lever from the extended part of the shaft 5.

The operation of the device will be readily understood. When the ball-arm of the lever 43 is in the extension of the shaft 5 (Fig. 21) the rotation of this shaft will have no effect upon the link 44, and the additional lifting parts are now removed from the transverse control. On the contrary, when the ball arm of the lever 43 is removed from the extension of the shaft 5 by the action of the jack 49, the link 44 is rotated about the pivot axis of the lever 43 and thus turns, by the ball pieces and their axles, the two shafts 47—47' in the same direction, which corresponds to a lowering of the additional lifting parts. Moreover, starting from a neutral position of additional lifting (Fig. 23), if the shaft 3 is rotated, the link 44 is displaced according to its position in one direction or the other (Fig. 24), thus actuating the said levers 45—45', and further, owing to the arrangement of oblique axles 48—48', this displacement will cause the rotation of the shafts 47—47' in contrary directions. In this case, the additional lifting parts participate in the transverse control.

I claim:

1. An airplane comprising wing flaps one on each side of the longitudinal plane of symmetry of the airplane, each wing flap being subdivided, in the direction of the width of the wings, into at least two relatively movable parts arranged one behind the other, means for moving the rear parts in opposite sense for transverse or roll control, the means for bringing the front part of said wing flaps into a working position in which they are more or less lowered, and means for gradually subjecting said front part to the transverse control when they are lowered.

2. An airplane as claimed in claim 1, comprising means for withdrawing gradually the marginal parts of the wing flaps at the same time that the front parts of said wing flaps are actuated.

3. An airplane as claimed in claim 1, comprising a mechanism for transmitting control motion to the front parts of the wing flaps, a shaft for the transverse control, a hand lever operating said shaft and an auxiliary control operating said mechanism and separating the ends of bars of said mechanism from said shaft.

4. An airplane as claimed in claim 1, comprising a mechanism for withdrawing the end parts of the wing flaps from the action of the transverse control, a shaft for said transverse control, a hand lever operating said shaft and an auxiliary control operating said mechanism and bringing the ends of bars of said mechanism nearer said shaft.

ROGER ROBERT.